United States Patent [19]

Takayama

[11] Patent Number: 4,987,535
[45] Date of Patent: Jan. 22, 1991

[54] INTERRUPTION CONTROL CIRCUIT

[75] Inventor: Shigeru Takayama, Tokyo, Japan

[73] Assignee: NEC Corporation, Tokyo, Japan

[21] Appl. No.: 298,289

[22] Filed: Jan. 17, 1989

Related U.S. Application Data

[63] Continuation of Ser. No. 749,690, Jun. 28, 1985, abandoned.

[30] Foreign Application Priority Data

Jul. 5, 1984 [JP] Japan .................... 59-139618

[51] Int. Cl.$^5$ .............................. G06F 7/00
[52] U.S. Cl. ...................... 364/200; 364/238.3;
364/238.6; 364/239; 364/239.7; 364/241.2;
364/242.1; 364/242.2; 364/263.2
[58] Field of Search ... 364/200 MS File, 900 MS File

[56] References Cited

U.S. PATENT DOCUMENTS

| | | | |
|---|---|---|---|
| 3,999,165 | 12/1976 | Kita et al. | 364/200 |
| 4,004,283 | 1/1977 | Bennett et al. | 364/200 |
| 4,200,912 | 4/1980 | Harrington et al. | 364/200 |
| 4,315,314 | 2/1982 | Russo | 364/200 |
| 4,349,872 | 9/1982 | Fukasawa et al. | 364/200 |

OTHER PUBLICATIONS

Intel Data Component Catalog 1981, Intel Corporation, Santa Clara, CA, pp. 123–139.

*Primary Examiner*—Eddie P. Chan
*Assistant Examiner*—Rebecca L. Rudolph
*Attorney, Agent, or Firm*—Sughrue, Mion, Zinn, Macpeak & Seas

[57] ABSTRACT

An interrupt control circuit is configured as a memory circuit to output interrupt vector information in response to multilevel interrupt requests for a CPU. The interrupt control circuit is provided with a plurality of interrupt vector generators configured as a memory matrix array. Each interrupt vector generator effects self-addressing based on the contents of a memory cell functioning as a latch circuit in which is stored an interrupt request and the contents of a memory cell functioning as a mask register in which interrupt control information is stored. The interrupt control circuit is further provided with a single output buffer commonly coupled to memory cells constituting each interrupt vector generator, thereby providing access to a self-addressed interrupt vector generator to concurrently output the interrupt vector information from the respective memory cells to a data bus via the single output buffer. A small-sized interrupt control circuit having a high signal transmission speed is thereby provided.

1 Claim, 3 Drawing Sheets

INTERRUPTION CONTROL CIRCUIT

This is a Continuation of application Ser. No. 06/749,690, filed Jun 28, 1985 now abandoned.

BACKGROUND OF THE INVENTION

The present invention relates to an interrupt control circuit, and more particularly to an interrupt control circuit operative to produce interrupt vector information from interrupt vector generators configured as a memory matrix array in response to interrupt requests. Specifically, the present invention is concerned with an interrupt control circuit wherein each interrupt vector generator has a self-addressing function to provide access to the self-addressed interrupt vector generator to thereby output interrupt vector information via a single output buffer.

First, a conventional interrupt control circuit will be described with reference to FIG. 1. This circuit includes input terminals 1, 2 and 3 receiving interrupt request signals, latch circuits 4, 5 and 6 connected to the input terminals 1, 2 and 3, respectively, an output terminal 7 for transmitting an interrupt request signal to a CPU (not shown), which is connected to respective outputs of the latch circuits 4, 5 and 6 through an OR gate 8, and an input terminal 9 for receiving an interrupt acknowledge signal from the CPU. The interrupt control circuit further includes AND gates 10, 11 and 12 for forming logical products outputs from the latch circuits 4, 5 and 6 and the interruption acknowledge signal from the input terminal 9, respectively, interruption vector generators 13, 14 and 15 each having a plural bit configuration, output buffers 16, 17 and 18 each having a plural bit configuration and outputting respective output signals from the interrupt vector generators 13, 14 and 15 depending upon the output states of the AND gates 10, 11 and 12, and a data bus 19 coupled in parallel with the output buffers 16, 17 and 18.

For instance, when an interrupt request signal is inputted to the input terminal 1, the latch circuit 4 becomes operative to latch the interrupt request signal. The output signal of the latch circuit 4 is fed to one input terminal of the AND gate 10 and is also fed to the output terminal 7 through the OR gate 8 as an interrupt request signal to the CPU. When the CPU accepts this interrupt signal, it outputs an interrupt acknowledge signal to the input terminal 9. As a result, the output buffer 16 is enabled by the interrupt acknowledge signal. Thus, an output signal (interrupt vector information) from the interrupt vector generator 13 is outputted to the data bus 19 via the output buffer 16. Further, in the case where an interrupt request signal is fed to the input terminal 2 or 3, a similar interrupt operation is carried out. Namely, interrupt vector information from the interrupt vector generator 14 and 15 is outputted to the data bus 19 via the output buffer 17 or 18.

In the above-mentioned conventional circuit for controlling a plurality of interrupts, output buffers having a plural bit configuration in the same number as that of the received interrupt are connected to the data bus 19. Accordingly, a large amount of traffic due to the large number of output buffers is placed on the data bus, with the result that the average signal transmission speed is lowered.

Further, from a mask layout point of view, it is difficult to accommodate a large number of output buffers having a large area.

SUMMARY OF THE INVENTION

With the above in view, an object of the present invention is to provide an interrupt control circuit which has eliminated the above-mentioned drawbacks.

According to the present invention, there is provided an interrupt control circuit configured as a memory circuit to output interrupt vector information in response to a plurality of interrupt request signals. The interrupt control circuit is provided with a plurality of interrupt information generators configured as a memory cell array, each of the interrupt vector generators effecting self-addressing, that is, addressing itself with a corresponding one of the interrupt request signals and corresponding interrupt information which it itself outputs. A single output buffer commonly coupled to each of the interrupt information generators outputs the interrupt information in response to an interrupt acknowledge signal supplied from the central processing unit.

BRIEF DESCRIPTION OF THE DRAWINGS

The features and advantages of an interrupt control circuit according to the present invention will become more apparent from the following description taken in conjunction with the accompanying drawings, in which.

DETAILED DESCRIPTION OF THE PREFERRED EMBODIMENT

Figure 1:
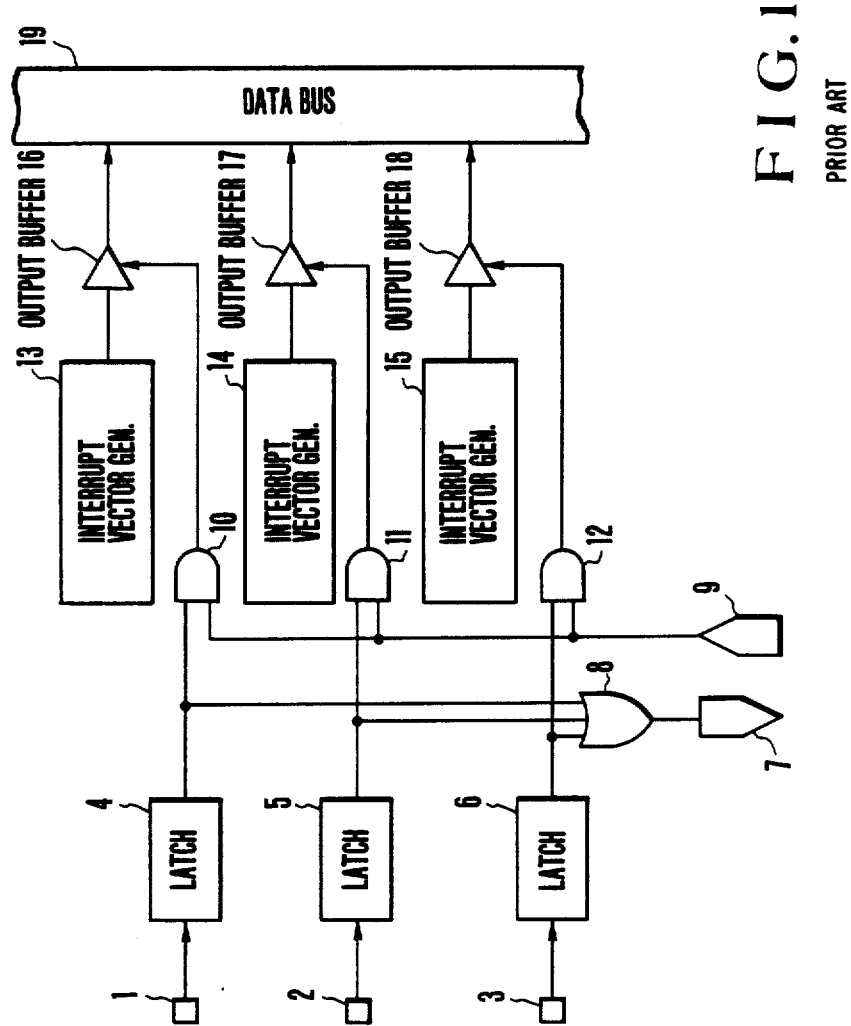
FIG. 1 is a block diagram schematically illustrating a conventional interrupt control circuit.
Figure 2:
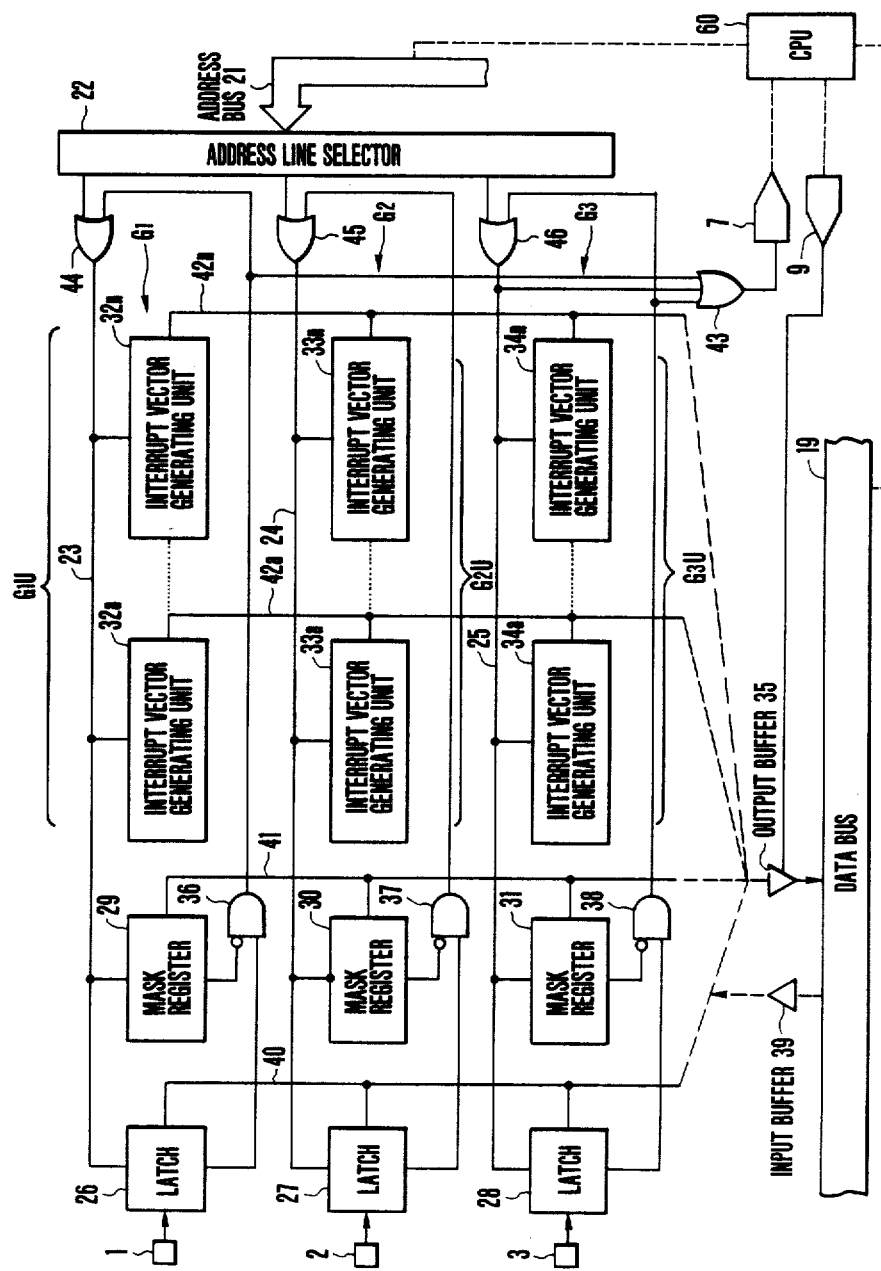
FIG. 2 is a black diagram illustrating an embodiment of an interrupt control circuit according to the present invention.

FIG. 2 shows a block diagram illustrating a preferred embodiment of an interrupt control circuit of the invention, wherein parts identical to those in FIG. 1 are designated by the same reference numerals, and therefore their explanation will be omitted.

The interrupt control circuit of this embodiment is configured as a memory circuit to output interrupt vector information in response to multilevel interrupt requests for a CPU 60. The interrupt control circuit includes a plurality of interrupt vector generators $G_1$, $G_2$ and $G_3$ configured as rows of a memory matrix array. Each interrupt vector generator effects self-addressing, that is, is addressed with the contents of a memory cell functioning as a latch circuit for latching an interrupt request and the contents of a memory cell functioning as a mask register in which interrupt control information is stored. Each interrupt control circuit $G_1$–$G_3$ further includes a single output buffer 35 commonly coupled to memory cells constituting each interrupt vector generator, thereby providing access to a self-addressed interrupt vector generator to concurrently output the interrupt vector information from the respective memory cells to a data bus via the single output buffer 35.

Since each row of the memory matrix array has the same arrangement, the configuration of only the first row will be described as an example. The first row constituting the interrupt vector generator $G_1$ includes a memory cell functioning as a latch circuit 26, a memory cell functioning as a mask register 29, and memory cells 32$a$ and 32$n$ constituting an interrupt vector generating unit G₁U. Each row further has an interrupt control gate 36 having one input terminal connected to the output of the latch circuit 26 and the other input terminal connected to the output of the mask register 29 to detect whether addressing is requested based on these outputs, thereby effecting self-addressing of the interrupt generator G₁.

The interrupt control circuit further includes an address line selector 22. An address bus 21 is coupled on the input side thereof and a plurality of address lines 23, 24 and 25 are coupled on the output side thereof. The address line 23 is coupled to the row G₁ through an OR gate 44. The interrupt control gate 36 has an output connected to one input of the OR gate 44.

Likewise, the address line 24 is coupled to respective memory cells 27, 30 and 33a–33n in the second row G₂ through an OR gate 45. An interrupt control gate 37 has an output connected to the input of the OR gate 45. Further, the address line 25 is coupled to respective memory cells 28, 31 and 34a–34n in the third row G₃ through an OR gate 46. An interrupt control gate 38 has an output connected to one input of the OR gate 46.

The interrupt control circuit further includes an input buffer 39 for writing the interrupt vector information into memory cells constituting the interrupt generating units G₁U–G₃U and the interrupt control information into the memory cell functioning as the mask register 29. The above-mentioned single output buffer 35 commonly connected in parallel with memory cells located on the columns of the memory matrix array via output lines 40, 41, and 42a to 42n. The CPU 60 is coupled (shown by dashed lines) to the output terminal 7, input terminal 9, data bus 19 and address bus 21.

Figure 3:
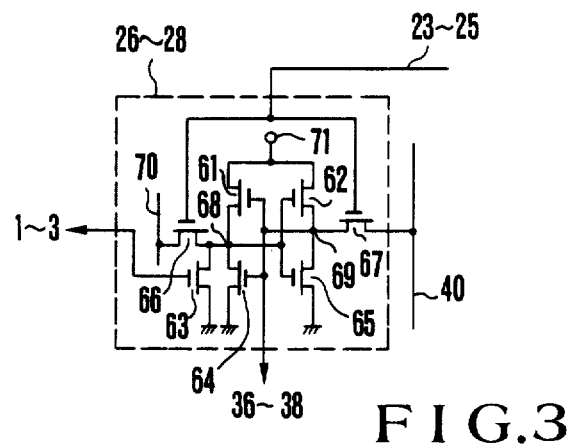
FIGS. 3 to 5 are circuit diagrams illustrating memory cells employed in the interrupt control circuit shown in FIG. 2.
Figure 4:
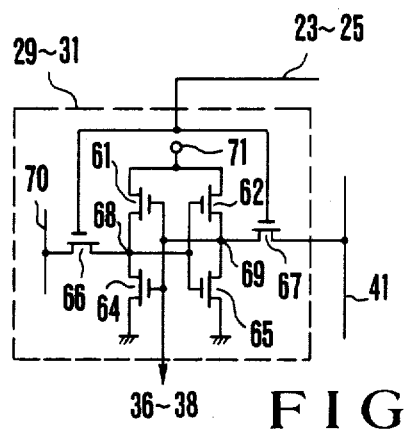
Figure 5:
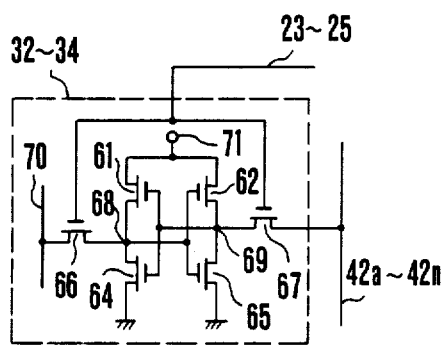

In addition, the memory cells 26 and 28, each functioning as a latch circuit, may be configured as a known memory circuit with a FET structure as shown in FIG. 3. Likewise, the memory cells 29 to 31, each functioning as mask register, may be configured as a known memory circuit with a FET structure as shown in FIG. 4. Further, the memory cells 32a–32n, 33a–33n and 34a–34n may be configured as a known memory circuit with an FET structure as shown in FIG. 5. To describe these circuits briefly, in FIG. 3, reference numerals 61 through 65 denote transistors constituting a latch unit of the memory cell, and 66 and 67 denote transistors for writing information into and reading information out of the memory cell. The reference numerals 68 and 69 denote output terminals of the latch unit.

For writing a data "1" into the memory cell, when the signal on the data line 40 is rendered "1" and the signal on the data line 70 is rendered "0" while the signal on the lines 23 to 25 is "1", the signal at 68 becomes "0" and the signal at 69 becomes "1". Thus, even when the signals on the lines 23 to 25 are "0", the terminal 68 maintains a "0" and the terminal 69 maintains a "1", and hence a "1" is written into the memory cell.

For subsequently reading data out of the memory cell, when the signal on the lines 23 to 25 is rendered "1", the values at terminals 68 and 69 are produced on the data lines 40 and 70. Even when the signal on the lines 23 to 25 is "0", as the signal on the terminal 1, 2 or 3 is rendered "1", the signal at 68 becomes a "0" and the signal at 69 becomes a "1". Consequently, even when the signal on the terminal 1, 2 or 3 becomes "0", the values at 68 and 69 are maintained and a "1" is written into the memory cell.

The value at the terminal 69 is always produced on the lines 36 to 38. Applied to a terminal 71 is a power supply voltage.

In FIGS. 4 and 5, like elements are designated by like reference numerals. It should be understood that the circuit shown in FIG. 4 is the same as the FIG. 3 circuit, with only the exception being the removal of the transistor 63 and a line extending therefrom to the terminal 1, 2 or 3. The circuit shown in FIG. 5 is the same as the FIG. 4 circuit, with only the exception being the removal of the lines 36 to 38.

The operation of the above-mentioned interrupt control circuit will be described.

When an interrupt request signal is applied at the input terminal 1, the latch circuit 26 is set to produce an output of logic "1" to the interrupt control gate 36. When the content of the mask register 29 is logic "0", the interrupt control gate 36 produces an output of logic "1". Thus, the address line 23 is selected. The contents of the memory cells 26, 29 and 32a–32n are concurrently inputted to the output buffer 35. In this instance, since the output of the interrupt control gate 36 is logic "1", the interrupt request signal to the CPU is outputted from the output terminal 7. When the CPU accepts this interrupt, the interrupt acknowledge signal is inputted to the input terminal 9. Thus, the output buffer 35 is enabled to output the contents of the memory cells 26, 29 and 32a–32n to the data bus 19 as the vector information.

However, even if the latch circuit is set by the interrupt request, when the content of the mask register 29 is logic "1", the interrupt operation is not effected since the interrupt control gate 36 produces an output of logic "0".

Similar interrupt control is effected in connection with interrupt requests due to the interrupt request signals applied on the input terminals 2 and 3.

The writing operation of the interrupt vector information into the memory cells constituting each interrupt generator will now be described.

When a certain address line is designated by an address transmitted via the address bus 21, the address line selector circuit 22 becomes operative to select the designated address line. Such a write operation of interrupt vector information and input information for the interrupt control gate is effected with respect to corresponding memory cells connected to the selected address line.

Thus, the interrupt control circuit of this embodiment requires only a single buffer having a multi-bit configuration connected to the data bus, even in the case where control of a plurality of interrupts is to be carried out. Accordingly, only a small data transmission burden is added to the data bus, and hence a high signal transmission speed is maintained. Further, the chip space for the output buffer is reduced.

As stated above, the interrupt control circuit according to the present invention makes it possible to process plural vector interrupts by means of a single output buffer having a multi-bit configuration. Accordingly, this causes the additional data transmission burden placed on the data bus 13 to be small, resulting in the maintenance of high speed signal transmission with small-sized circuits. Further, since interrupt vector information can be arbitrarily written into the memory cell, it is possible to effect expanded interrupt control by setting a plurality of vectors with respect to one interrupt.

What is claimed is:

1. An interruption control circuit for transmitting interruption information to a CPU via a bus, comprising:
   a plurality of input terminals, each of which receives an interruption request signal from a corresponding one of a plurality of interruption requests sources;
   a plurality of storage means corresponding to said input terminals respectively, each of which stores interruption vector information corresponding to each of the interruption request sources and includes a selection terminal and an output terminal to read out the stored interruption vector information therefrom to said output terminal in response to a supply of a selection signal to said selection terminal;
   a single output buffer means having an input terminal commonly connected to the output terminal of each of said plural storage means and an output terminal connected to the bus, for transmitting the interruption vector information supplied to its input terminal to the bus in response to an interruption acknowledge signal given from the CPU;
   a detection means connected to said plural input terminals for detecting the input terminal which has received the corresponding interruption request signal and for generating a detection signal representing that input terminal;
   first means connected to said detection means and the selection terminals of said plurality of storage means for supplying said detection signal, as said selection signal, to the selection terminal of the storage means corresponding to said input terminal which has received said corresponding interruption request signal; and
   second means connected to said detection means for generating an interruption request to the CPU in response to said detection signal, the CPU generating said interruption acknowledge signal when the CPU accepts said interruption request from said second means for supplying said interruption acknowledge signal to said single output buffer,
   whereby the interruption vector information stored in said storage means corresponding to said input terminal which has received said corresponding interruption request signal, is read out therefrom and supplied to the input terminal of said single output buffer means before the CPU generates a first interruption acknowledge signal following said interruption request, and the single output buffer immediately transmits the read-out interruption vector information onto the bus in response to said interruption acknowledge signal supplied from the CPU.

* * * * *